US008621849B2

(12) United States Patent
Vernassa et al.

(10) Patent No.: US 8,621,849 B2
(45) Date of Patent: Jan. 7, 2014

(54) METHOD FOR DIAGNOSING A DIESEL OXIDATION CATALYST

(75) Inventors: Roberto Vernassa, Volpiano (IT); Francesco Cianflone, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 116 days.

(21) Appl. No.: 13/321,595

(22) PCT Filed: Mar. 27, 2010

(86) PCT No.: PCT/EP2010/001954

§ 371 (c)(1),
(2), (4) Date: Nov. 21, 2011

(87) PCT Pub. No.: WO2010/133276

PCT Pub. Date: Nov. 25, 2010

(65) Prior Publication Data

US 2012/0060478 A1    Mar. 15, 2012

(30) Foreign Application Priority Data

May 21, 2009  (GB) .................................. 0908753.7

(51) Int. Cl.
*F01N 3/00*      (2006.01)
*F01N 3/10*      (2006.01)

(52) U.S. Cl.
USPC .................... 60/288; 60/286; 60/299; 60/300

(58) Field of Classification Search
USPC ........................... 60/277, 286, 299, 300, 303
See application file for complete search history.

(56) References Cited

U.S. PATENT DOCUMENTS

| | | | |
|---|---|---|---|
| 5,938,715 A | 8/1999 | Zhang et al. |
| 6,389,805 B1 | 5/2002 | Poggio et al. |
| 2002/0197721 A1 | 12/2002 | Kinugawa et al. |
| 2005/0279156 A1 | 12/2005 | He et al. |
| 2006/0225492 A1 | 10/2006 | Pfister |
| 2008/0040014 A1 | 2/2008 | Yahata et al. |

FOREIGN PATENT DOCUMENTS

| | | |
|---|---|---|
| EP | 1096117 A1 | 5/2001 |
| EP | 1323905 A1 | 7/2003 |
| EP | 1365122 A2 | 11/2003 |

OTHER PUBLICATIONS

International Searching Authority, International Search Report for Application No. PCT/EP2010/001954, dated Jun. 9, 2010.

*Primary Examiner* — Kenneth Bomberg
*Assistant Examiner* — Audrey K Bradley
(74) *Attorney, Agent, or Firm* — Ingrassia Fisher & Lorenz, P.C.

(57) ABSTRACT

A method and a control system are provided for diagnosing a diesel combustion catalyst that is located in an exhaust line within a diesel engine system. The method comprising providing an unburned fuel mass flow through the diesel oxidation catalyst, determining the oxidation heat release rate which is related to the exothermic oxidation reactions of the unburned fuel into the diesel oxidation catalyst, integrating the determined oxidation heat release rate on a time interval, integrating the unburned fuel mass flow on the same time interval, dividing the integrated value of oxidation heat release rate and the integrated value of unburned fuel mass flow for determining an efficiency index (DOI) of the diesel oxidation catalyst.

17 Claims, 2 Drawing Sheets

METHOD FOR DIAGNOSING A DIESEL OXIDATION CATALYST

CROSS-REFERENCE TO RELATED APPLICATIONS

This application is a U.S. National-Stage entry under 35 U.S.C. §371 based on International Application No. PCT/EP2010/001954, filed Mar. 27, 2010, which was published under PCT Article 21(2) and which claims priority to British Application No. 0908753.7, filed May 21, 2009, which are all hereby incorporated in their entirety by reference.

TECHNICAL FIELD

The technical field relates to diagnosing a diesel oxidation catalyst within a diesel engine system.

BACKGROUND

A diesel engine system generally comprises one or more combustion chambers, which are individually defined by a reciprocating piston inside a cylinder. The cylinder is provided with electrically controllable injection means for injecting fuel inside the combustion chamber. The cylinder is also provided with one or more intake valves for cyclically opening the combustion chamber towards an intake line for receiving fresh airflow, and with one or more exhaust valves for cyclically opening the combustion chamber towards an exhaust line for discharging the exhaust gases.

The exhaust line comprises a diesel oxidation catalyst (DOC) which is conventionally provided for reducing the toxicity of emissions from diesel engine. In order to accomplish tighter emission legislation, most of the diesel engine systems are also equipped with a diesel particulate filter (DPF), which is located in the exhaust line downstream the DOC for capturing and removing diesel particulate matter (soot) from the exhaust gas flow.

The diesel oxidation catalyst (DOC) is especially provided for oxidizing hydrocarbons (HC) and carbon monoxides (CO), which are formed in the combustion process of the engine and are contained in the exhaust gas flow. More particularly, the diesel oxidation catalyst uses excess oxygen ($O_2$) in the exhaust gas flow for oxidizing carbon monoxide to carbon dioxide ($CO_2$), and for oxidizing hydrocarbons to water ($H_2O$) and carbon dioxide ($CO_2$). Such oxidations are exothermic reactions, which increase the catalyst temperature as well as the temperature of the exhaust gas flow downstream the catalyst.

The total heat rate within an active diesel particulate catalyst is determined by two main factors. The first main factor is represented by the heat exchange rate, which is related to the conventional processes between exhaust gases, diesel oxidation catalyst, and environment. The second main factor is represented by the oxidation heat release rate, which is related to the exothermic oxidation reactions into the diesel oxidation catalyst. This second main factor is a key parameter in establishing the diesel oxidation catalyst efficiency.

During its operative life, diesel oxidation catalysts gradually reduce their efficiency. Modern diesel engine systems are provided with a diagnostic system suitable for determining an efficiency index of the diesel oxidation catalyst. Such diagnostic system generally comprise two sensors for measuring the exhaust gas temperature upstream and downstream the diesel oxidation catalyst.

A microprocessor-based controller applies said temperature measures to a computer code for calculating the actual oxidation heat release rate, which is related to the exothermic oxidation reactions in the diesel oxidation catalyst. The controller further comprises a computer code for implementing a physical model of the diesel oxidation catalyst, by means of which the oxidation heat release rate is estimated as a function of the exhaust gas temperature upstream the catalyst. Such a model is calibrated on a fresh diesel oxidation catalyst, in order to estimate the nominal oxidation heat release rate, which is theoretically produced by a new catalyst.

The efficiency index is then calculated dividing the actual (measured) heat release rate by the estimated (nominal) heat release oxidation rate. In fact, such efficiency index establishes the rate at which the exothermic reactions occur in the diesel oxidation catalyst as expected by a fresh catalyst. Therefore, when the efficiency index is below a certain threshold, the diagnostic system warns that the diesel oxidation catalyst is faulty and must be replaced.

A drawback of the above-mentioned diagnostic device is that the effectiveness of the index is strongly dependent on the DOC physical model error. Another drawback is that such a physical model is generally very complex, so that it is difficult to calibrate and requires a powerful hardware to be implemented.

Accordingly, at least one aim is to solve, or at least to positively reduce, the above-mentioned drawbacks with a simple, rational and inexpensive solution. In addition, other aims, desirable features, and characteristics will become apparent from the subsequent summary and detailed description, and the appended claims, taken in conjunction with the accompanying drawings and this background.

SUMMARY

A method is provided for diagnosing a diesel oxidation catalyst located in an exhaust line within a diesel engine system. The method comprises:
providing an unburned fuel mass flow through the diesel oxidation catalyst, determining the oxidation heat release rate which is related to the exothermic oxidation reactions of the unburned fuel in the diesel oxidation catalyst, integrating the determined oxidation heat release rate on a time interval, integrating the unburned fuel mass flow over the same time interval, and
the integrated value of oxidation heat release rate and the integrated value of unburned fuel mass flow, for determining an efficiency (or aging) index of the diesel oxidation catalyst.

In fact, the efficiency index represents the actual fuel ratio that the diesel oxidation catalyst is able to oxidize. The diagnostic method do not requires estimation of the nominal heat release oxidation rate. Therefore, the diagnostic method avoids complicated physical model for calculating the nominal heat release of the diesel oxidation catalyst as well as long calibration time, and leads to cost and time saving.

The diagnostic method can be performed at any time during the engine system functioning, if a large amount of fuel is injected into the engine system for reaching the diesel oxidation catalyst unburnt. In this case, the diagnostic method is referred as intrusive diagnosis. Such an intrusive diagnosis has the advantage of being frequently feasible, but it has the disadvantage of increasing the fuel consumption.

Alternatively, the diagnostic method according to the invention can be performed during the DPF regeneration process, when a large amount of fuel is already injected in the combustion chambers for reaching the diesel oxidation catalyst unburnt. The regeneration process is for removing the particulate matter, which is, trapped in the diesel particulate filter (DPF) downstream the diesel oxidation catalyst. The regeneration is achieved by heating the DPF to a temperature at which the accumulated particulate matter burns off, leaving the filter clean again.

It is known to heat the filter by means of a temperature increase of the exhaust gases entering the DPF. This temperature increase is obtained with a dedicated combustion mode, by means of which an amount of fuel is injected into a combustion chamber of the engine when the piston has passed its top dead center position. Such late-injected fuel can get a first temperature increase due to fuel combustion inside combustion chamber, and a second temperature increase due to fuel oxidation inside the catalyst (DOC) of the exhaust line.

Conventionally, the second temperature increase is achieved by the so-called Post-Injections, which are late fuel injections that do not burn inside the combustion chamber. The post-injected fuel is ejected unburnt from the combustion chamber and is channeled by exhaust line towards the diesel oxidation catalyst (DOC).

Performing the diagnostic method during the regeneration of the DPF has the advantage of not requiring a dedicated fuel injection. In this case, the diagnostic method is referred as non-intrusive diagnosis.

A control system is provided for a diesel engine system, which comprises a microprocessor-based controller for performing the diagnostic method.

BRIEF DESCRIPTION OF THE DRAWINGS

The present invention will hereinafter be described in conjunction with the following drawing figures, wherein like numerals denote like elements, and.

DESCRIPTION OF THE PREFERRED EMBODIMENT

The following detailed description is merely exemplary in nature and is not intended to limit application and uses. Furthermore, there is no intention to be bound by any theory presented in the preceding background or summary or the following detailed description.

Figure 1:
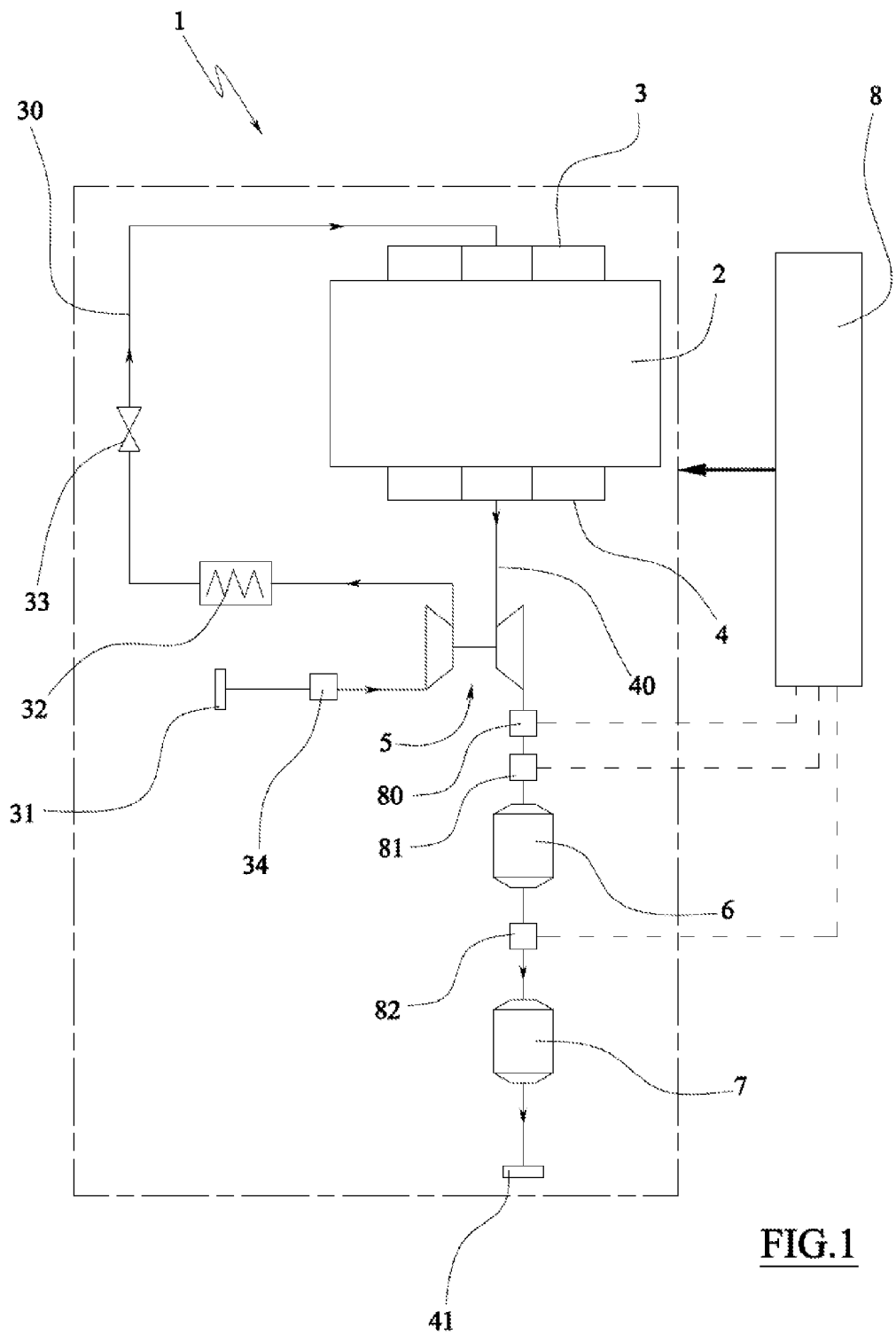
FIG. 1 is a schematic illustration of a diesel engine system and engine controller in accordance with one embodiment.

A preferred embodiment of the present invention is applied to a turbocharged diesel engine system, which is generally labeled 1 in FIG. 1. The diesel engine system 1 comprises engine 2 having intake manifold 3 and exhaust manifold 4, each of which comprises a plurality of runners corresponding in number to the number of individual combustion chambers of the engine 2. Intake manifold 3 is located at the end of an intake line 30, while the exhaust manifold 4 is located at the beginning of an exhaust line 40.

Intake line 30 comprises an inlet 31 for aspirating air at substantially atmospheric pressure. Downstream the inlet 31, a well-known turbocharger 5 is located in the intake line 30, for compressing the airflow and for providing it to an intercooler 32. Further, downstream, the intake line 30 comprises an intake throttle valve 33, which is electrically controllable for varying the intake restriction.

The exhaust gases are expelled from individual combustion chambers of the engine 2 to the corresponding plurality of runners and into the exhaust manifold 4. Exhaust line 40 channels the exhaust gases from the exhaust manifold 4 to drive the turbine of turbocharger 5 and thereafter to atmosphere through an outlet 41. Between turbocharger 5 and the outlet 41, the exhaust line 40 comprises a diesel oxidation catalyst 6 (DOC) provided for oxidizing residual hydrocarbons and carbon oxides which are produced by the fuel combustion inside the engine 2, and which are contained in the exhaust gas flow.

Downstream the diesel oxidation catalyst 6, a diesel particulate filter 7 (DPF) is located in the exhaust line 40 for capturing and removing diesel particulate matter (soot) from the exhaust gas flow, before it reaches the outlet 41. Integral to the diesel engine system 1 is a control system, which generally comprises sensing means for providing respective measures of a plurality of engine operating parameters, and a microprocessor based controller 8 (ECM), for applying the engine operating parameter measures to engine control routines. In this case, the control system comprises a mass flow sensors 80 for measuring the exhaust gas mass flow upstream the diesel oxidation catalyst 6, a first temperature sensors 81 for measuring the exhaust gas temperature upstream the diesel oxidation catalyst 6, a second temperature sensor 82 for measuring the exhaust gas temperature downstream the diesel oxidation catalyst 6.

The ECM comprises a computer code for using such mass flow and temperature measures for determining the oxidation heat release rate, which is related to the exothermic oxidation reactions in the diesel oxidation catalyst 6. Oxidation heat release rate can be obtained by using any conventional routine method. Preferably, oxidation heat release rate is determined by using the method, which is described hereinafter.

The method is based on the assumption that the main factors which contribute to the total heat exchange rate in an active diesel oxidation catalyst are:

heat exchange rate which is related to the conventional convective processes between exhaust gases, diesel oxidation catalyst and environment; and oxidation heat release rate that is related to the exothermic oxidation reactions into the diesel oxidation catalyst. The method approach is to estimate the conventional convective heat exchange rate with a thermal model of the inert part of DOC, and to subtract such contribute from the total heat exchange rate, for estimating the oxidation heat release rate.

According to the method approach, the ECM initially determines the oxidation heat release rate by using a thermal model of a non-active (inert) diesel oxidation catalyst, where no oxidation reaction takes place and only conventional convective exchange have to be modeled.

Figure 2:
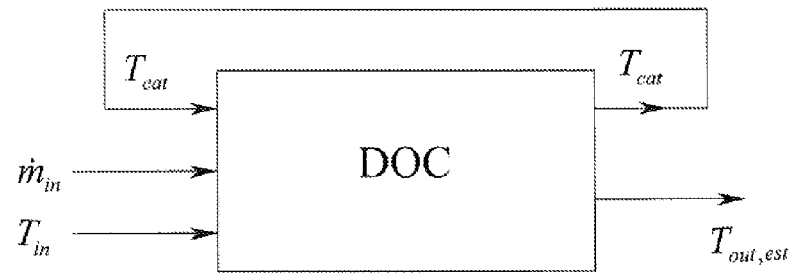
FIG. 2 is a schematic illustration of a non-active diesel oxidation catalyst thermal model.

The non-active diesel oxidation catalyst model is illustrated in FIG. 2. The significant model inputs are identified as the exhaust gas mass flow rate into the diesel oxidation catalyst $\dot{m}_{in}$, the exhaust gas temperature $T_{in}$ upstream the diesel oxidation catalyst, and the catalyst substrate thermal state, which can be represented by the mean catalyst temperature $T_{cat}$. The significant model output is identified as the estimated exhaust gas temperature $T_{out,est}$ downstream the diesel oxidation catalyst.

The following algebraic and differential modeling equations describe the non-active diesel oxidation catalyst:

$$\frac{dQ_{in}}{dt} + \frac{dQ_{out}}{dt} + \frac{dQ_{exch}}{dt} = 0 \quad (1)$$

$$C\frac{dT_{cat}}{dt} = \frac{dQ_{exch}}{dt} \quad (2)$$

where:

$\frac{dQ_{in}}{dt}$ = input heat rate upstream the diesel oxidation catalyst;

$\frac{dQ_{out}}{dt}$ = output heat rate downstream the diesel oxidation catalyst;

$\frac{dQ_{exch}}{dt}$ = conventional convective heat exchange rate between exhaust gases, diesel oxidation catalyst and environment; and C=diesel oxidation catalyst heat capacity.

The total heat exchange $Q_{exch}$ can be expressed as the addition of two main thermal exchange contributions, according to the following equation:

$$Q_{exch} = Q_{exch1} + Q_{exch2}$$

where:
$Q_{exch1}$=convective heat exchange between exhaust gas and catalyst, $Q_{exch2}$=convective heat exchange between catalyst and external environment. The convective heat exchange $Q_{exch1}$ is a function of the exhaust gas mass flow $\dot{m}_{in}$ upstream the catalyst, the exhaust gas temperature $T_{in}$ upstream the catalyst, and the catalyst temperature $T_{cat}$:

$$Q_{exch1} = k_1 \dot{m}_{in}(T_{in} - T_{cat}) \quad (3).$$

The convective heat exchange $Q_{exch2}$ is a function of the catalyst temperature $T_{cat}$ and the external environment (ambient) temperature $T_{amb}$:

$$Q_{exch2} = k_2(T_{amb} - T_{cat}) \quad (4).$$

The input heat rate and the output heat rate are defined according to the following equations:

$$\frac{dQ_{in}}{dt} = \dot{m}_{in} C_p T_{in} \quad (5)$$

$$\frac{dQ_{out}}{dt} = -\dot{m}_{out} C_p T_{out,est} \quad (6)$$

where:
$\dot{m}_{in}$=exhaust gas mass flow upstream the diesel oxidation catalyst, $\dot{m}_{out}$=exhaust gas mass flow downstream the diesel oxidation catalyst, $T_{in}$=exhaust gas temperature upstream the diesel oxidation catalyst, $T_{out,est}$=estimated exhaust gas temperature downstream the DOC, and $C_p$=exhaust gas specific heat.

The exhaust gas mass flow $\dot{m}_{in}$ and the gas temperature $T_{in}$ are measured by means of the respective sensors 80 and 81. The exhaust gas mass flow $\dot{m}_{out}$ downstream the catalyst can be assumed equal to the exhaust gas mass flow $\dot{m}_{in}$ in upstream the catalyst. Therefore, the equations (1), (2), (3), (4), (5) and (6) define a nonlinear dynamic system, whose standard equation formulation is the following:

$$\begin{cases} \frac{dx}{dt} = f(x, u_1 \dots u_n) \\ y = g(x, u_1 \dots u_n) \end{cases}$$

where $u_i$ are the input variables, x is the status variable of the system and y is the output variable.

In the present case, the input variables $u_i$ are represented by the exhaust gas temperature $T_{in}$ and the exhaust gas mass flow $\dot{m}_{in}$ upstream the catalyst, the status variable x of the system is represented by the catalyst temperature $T_{cat}$, and the output variable y is represented by the estimated exhaust gas temperature $T_{out,est}$ downstream the diesel oxidation catalyst. Such nonlinear dynamic system can be solved by the ECM using a known discrete time methods, in order to estimate the exhaust gas temperature $T_{out,est}$.

The non-active DOC model can be calibrated using identification techniques in order to minimize the differences between the estimated exhaust gas temperature $T_{out,est}$ and the real exhaust gas temperature $T_{out,meas}$ measured by sensor 82, when the diesel oxidation catalyst 6 is in non-active state.

Figure 3:
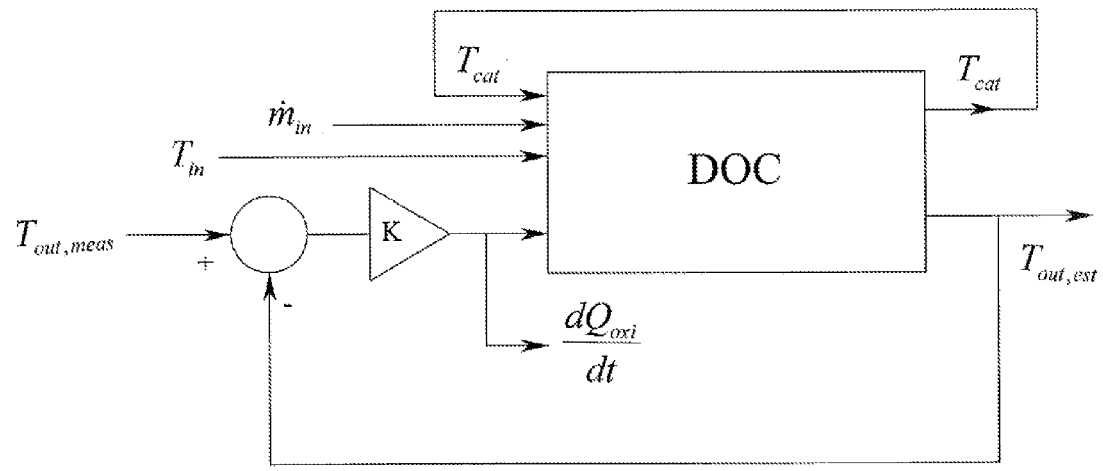
FIG. 3 is a schematic illustration of a flow chart of a closed loop mechanism for estimating the oxidation heat release.

As illustrated in FIG. 3, when the DOC goes in active state, the error caused by the missing oxidation heat release in the preceding model is compensated by feeding back the estimated exhaust gas temperature $T_{out,est}$ and calculating the oxidation heat release rate $$\frac{dQ_{oxi}}{dt}$$

according to the following equation:

$$\frac{dQ_{oxi}}{dt} = K(T_{out,meas} - T_{out,est}).$$

The diesel oxidation model is then corrected according to the new equation (2):

$$C\frac{dT_{cat}}{dt} = \frac{dQ_{exch}}{dt} + \frac{dQ_{oxi}}{dt} = \frac{dQ_{exch}}{dt} + K(T_{out,meas} - T_{out,est}) \quad (2')$$

Therefore, a corrected exhaust gas temperature $T_{out,est*}$ is obtained by solving the nonlinear dynamic system defined by the equations (1), (2'), (3), (4), (5) and (6).

Finally, the corrected exhaust gas temperature $T_{out,est*}$ is subtracted from the measured outlet temperature $T_{out,meas}$ and then multiplied by the predetermined proportional factor K in order to obtain a corrected value for $$\frac{dQ_{oxi}}{dt},$$

which is the desired heat exchange rate related to the exothermic oxidation reactions.

The oxidation heat release rate is used for performing a diagnostic method of the diesel oxidation catalyst 6. The diagnostic method comprises providing an unburned fuel mass flow through the diesel oxidation catalyst 6, in order to promote the oxidation reactions therein. Such unburned fuel mass flow is provided by the ECM with a dedicated injection pattern, by means of which one or more post-injections are injected into the combustion chamber after the piston has passed its top dead center (TDC).

Post-injections start sufficiently far from TDC for the fuel to not burn into the combustion chamber, typically after the exhaust valves opening. Therefore, the post-injected fuel is ejected unburnt from the combustion chamber and is channeled by the exhaust line 40 towards the diesel oxidation catalyst 6.

The ECM can provide such post-injections at any time during the engine system functioning, for instance during engine overrun or in engine steady state. In this case, the diagnostic method is referred as intrusive diagnosis. Alternatively, the ECM can provide such post-injections during the DPF regeneration process, for contemporaneously heating the exhaust gas flow to a temperature at which the particulate matter accumulated in the DPF burns off. In this case, the diagnostic method is referred as non-intrusive diagnosis. In both cases, the unburned fuel mass flow is determined by the ECM using a preset map that correlates the amount of post-injected fuel to a plurality of engine operating parameters, for example, engine speed and engine load.

During post-injections, the diagnostic method comprises determining the oxidation heat release rate, which is related to the exothermic oxidation of the unburned fuel flow into the diesel oxidation catalyst. As explained above, the ECM determines the oxidation heat release rate by using the exhaust gas mass flow upstream the DOC, the exhaust gas temperature upstream the DOC, and the exhaust gas temperature downstream the DOC, which are respectively measured by the sensors 80-82.

Finally, the diagnostic method comprises determining a diesel oxidation catalyst efficiency index DOI, according to the following equation:

$$DOI = \frac{\int_{ta}^{tb} \frac{dQ_{oxi}}{dt} dt}{\int_{ta}^{tb} \frac{dQ_{fuel}}{dt} dt}$$

where:

$\frac{dQ_{oxi}}{dt}$ = oxidation heat release rate in the DOC during the diagnosis;

$\frac{dQ_{fuel}}{dt}$ = unburned fuel mass flow through the DOC during the diagnosis;

$\int_{ta}^{tb} \frac{dQ_{oxi}}{dt} dt$ = integral of the oxidation heat release rate on a preset time interval(ta, tb);

$\int_{ta}^{tb} \frac{dQ_{fuel}}{dt} dt$ = integral of the unburned fuel rate on the same preset time interval(ta, tb);

ta is the time at which exhaust gas temperature downstream DOC reaches a certain value $T_{out,a}$; and tb is the time at which exhaust gas temperature downstream DOC reaches a certain value $T_{out,b}$ that is higher than $T_{out,a}$.

According to an embodiment, $T_{out,a}$ is comprised between approximately 250° C. and approximately 350° C., while $T_{out,b}$ is comprised between approximately 450° C. and approximately 550° C. Preferably, $T_{out,a}$ is equal to approximately 300° C. and $T_{out,b}$ is equal to approximately 500° C.

The integrals have been introduced in order to get the maximum index sensitivity, especially for diagnosing the DOC during the DPF regeneration.

In fact, $$\int_{ta}^{tb} \frac{dQ_{oxi}}{dt} dt$$

represents the heat that is produced by the oxidation reactions in the DOC, for raising the exhaust gas temperature downstream the DOC from $T_{out,a}$ to $T_{out,b}$.

$$\int_{ta}^{tb} \frac{dQ_{fuel}}{dt} dt$$

represents the amount of unburned fuel that is passed through the DOC, for raising the exhaust gas temperature downstream the DOC from $T_{out,a}$ to $T_{out,b}$. Therefore, the diesel oxidation index DOI is correlated to the DOC efficiency.

According to the invention, the DOI can be compared with a preset threshold, beneath which the ECM warns that the DOC is faulty and must be replaced. ECM can use the diesel oxidation index DOI also for controlling the after-treatment of the exhaust gas. By way of example, DOI can be useful for assisting DPF regeneration, feed gas generation for an SCR systems (DOC must be able to increase $NO_2$ concentration upstream of an SCR system), and ammonia slip prevention downstream an SCR system (DOC must have proper HC, CO, $NO_x$ conversion capability).

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A method for diagnosing a diesel oxidation catalyst that is located in an exhaust line within a diesel engine system, comprising:
    providing an unburned fuel mass flow through the diesel oxidation catalyst;
    determining an oxidation heat release rate related to exothermic oxidation reactions of an unburned fuel into the diesel oxidation catalyst;
    integrating the oxidation heat release rate on a time interval;
    integrating the unburned fuel mass flow on the time interval; and
    dividing an integrated value of oxidation heat release rate by an integrated value of unburned fuel mass flow for determining an efficiency index of the diesel oxidation catalyst.

2. The method according to claim 1, further comprising comparing the efficiency index with a preset threshold beneath which the diesel oxidation catalyst is considered faulty.

3. The method according to claim 1, wherein a diesel particulate filter is located in the exhaust line downstream of the diesel oxidation catalyst, and the method further comprising providing the unburned fuel mass flow as post-injected fuel during a diesel particulate filter regeneration.

4. The method according to claim 1, wherein a lower limit of the time interval is a first time at which exhaust gas downstream of the diesel oxidation catalyst reaches a first temperature, and an upper limit of the time interval is a second time at which exhaust gas downstream of the diesel oxidation catalyst reaches a second temperature that is higher than the first temperature.

5. The method according to claim 4, wherein the first temperature is between 250° C. and 350° C. and the second temperature is between 450° C. and 550° C.

6. The method according to claim 1, wherein the determining the oxidation heat release rate comprises:
   measuring a plurality of engine operating parameters;
   measuring the exhaust gas temperature downstream of the diesel oxidation catalyst;
   providing a thermal model of a diesel oxidation catalyst for estimating the exhaust gas temperature downstream of the diesel oxidation catalyst based at least in part on a plurality of engine operating parameters; and
   implementing a thermal model of the diesel oxidation catalyst in a closed loop mechanism,
   wherein an error between the measured exhaust gas temperature and the estimated exhaust gas temperature downstream of the diesel oxidation catalyst is used for estimating the oxidation heat release rate.

7. The method according to claim 6, wherein the plurality of engine operating parameters comprises the exhaust gas mass flow rate upstream of the diesel oxidation catalyst and the exhaust gas temperature upstream of the diesel oxidation catalyst.

8. A control system for a diesel engine system comprising:
   an exhaust line;
   a diesel oxidation catalyst located in the exhaust line;
   a fuel injector configured to provide an unburned fuel flow through the diesel oxidation catalyst; and
   a controller configured to:
     provide an unburned fuel mass flow through the diesel oxidation catalyst;
     determine an oxidation heat release rate that is related to exothermic oxidation reactions of an unburned fuel into the diesel oxidation catalyst;
     integrate the oxidation heat release rate on a time interval;
     integrate the unburned fuel mass flow on the time interval; and
     divide an integrated value of oxidation heat release rate by an integrated value of unburned fuel mass flow for determining an efficiency index of the diesel oxidation catalyst.

9. The control system according to claim 8, further comprising a sensor configured to measure the exhaust gas temperature downstream of the diesel oxidation catalyst.

10. The control system according to claim 8, further comprising a sensor configured to measure the exhaust gas temperature upstream of the diesel oxidation catalyst.

11. The control system according to claim 8, further comprising a sensor configured to measure the exhaust gas mass flow upstream of the diesel oxidation catalyst.

12. The control system according to claim 8, the controller further configured to compare the efficiency index with a preset threshold beneath which the diesel oxidation catalyst is considered faulty.

13. The control system according to claim 8, wherein a diesel particulate filter is located in the exhaust line downstream of the diesel oxidation catalyst, and the controller is further configured to provide the unburned fuel mass flow as post-injected fuel during a diesel particulate filter regeneration.

14. The control system according to claim 8, wherein a lower limit of the time interval is a first time at which exhaust gas downstream of the diesel oxidation catalyst reaches a first temperature, and an upper limit of the time interval is a second time at which exhaust gas downstream of the diesel oxidation catalyst reaches a second temperature that is higher than the first temperature.

15. The control system according to claim 14, wherein the first temperature is between 250° C. and 350° C. and the second temperature is between 450° C. and 550° C.

16. The control system according to claim 8, wherein the controller is configured to determine the oxidation heat release rate by:
   measuring a plurality of engine operating parameters;
   measuring the exhaust gas temperature downstream of the diesel oxidation catalyst;
   providing a thermal model of a diesel oxidation catalyst for estimating the exhaust gas temperature downstream of the diesel oxidation catalyst based at least in part on a plurality of engine operating parameters; and
   implementing a thermal model of the diesel oxidation catalyst in a closed loop mechanism,
   wherein an error between the measured exhaust gas temperature and the estimated exhaust gas temperature downstream of the diesel oxidation catalyst is used for estimating the oxidation heat release rate.

17. The control system according to claim 16, wherein the plurality of engine operating parameters comprises the exhaust gas mass flow rate upstream of the diesel oxidation catalyst and the exhaust gas temperature upstream of the diesel oxidation catalyst.

* * * * *